(12) United States Patent
Nishino

(10) Patent No.: US 10,250,169 B2
(45) Date of Patent: Apr. 2, 2019

(54) ROBOT SYSTEM

(71) Applicant: DENSO WAVE INCORPORATED, Chita-gun, Aichi-pref. (JP)

(72) Inventor: Hideyuki Nishino, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 198 days.

(21) Appl. No.: 15/248,569

(22) Filed: Aug. 26, 2016

(65) Prior Publication Data

US 2017/0093309 A1 Mar. 30, 2017

(30) Foreign Application Priority Data

Sep. 25, 2015 (JP) ................. 2015-188078

(51) Int. Cl.
| | |
|---|---|
| *H02P 27/06* | (2006.01) |
| *H02P 3/22* | (2006.01) |
| *B25J 9/12* | (2006.01) |
| *B25J 9/16* | (2006.01) |
| *B25J 19/00* | (2006.01) |
| *B25J 19/06* | (2006.01) |
| *H02P 29/024* | (2016.01) |

(52) U.S. Cl.
CPC ................... *H02P 3/22* (2013.01); *B25J 9/12* (2013.01); *B25J 9/126* (2013.01); *B25J 9/1674* (2013.01); *B25J 19/0004* (2013.01); *B25J 19/06* (2013.01); *H02P 27/06* (2013.01); *H02P 29/024* (2013.01)

(58) Field of Classification Search
CPC .... H02P 29/032; H02P 29/0241; H02P 27/06; H02P 29/027; H02P 29/024; H02P 29/028; H02P 3/04; B25J 9/1674; B25J 19/0004; B25J 19/06
USPC ... 318/375, 366, 563, 564, 565, 400.27, 722
See application file for complete search history.

(56) References Cited

U.S. PATENT DOCUMENTS

| | | | |
|---|---|---|---|
| 5,369,349 A | 11/1994 | Tsuchiya et al. | |
| 2004/0135528 A1* | 7/2004 | Yasohara | H03K 17/04123 318/400.26 |
| 2006/0214618 A1 | 9/2006 | Hashimoto et al. | |

(Continued)

FOREIGN PATENT DOCUMENTS

| | | |
|---|---|---|
| JP | 2009-213313 A | 9/2009 |
| JP | 2011-067017 A | 3/2011 |

(Continued)

*Primary Examiner* — Thai Dinh

(74) *Attorney, Agent, or Firm* — Oliff PLC

(57) ABSTRACT

A robot system includes a motor, an inverter, a first control portion, and a second control portion. The motor includes stator windings for three phases. The inverter includes series-connection bodies of a high-side switch and a low-side switch for three phases. A connection point of the high-side switch and the low-side switch for each of the phases is connected with the corresponding stator winding. One of the high-side switch and the low-side switch for each of the phases works as a brake switch. The first control portion and the second control portion performs a driving control of the brake switches. Each of the first control portion and the second control portion has a function of monitoring the robot system, and turns on the brake switches for at least two phases when detecting that an abnormality occurs in the robot system.

7 Claims, 8 Drawing Sheets

(56) References Cited

U.S. PATENT DOCUMENTS

| | | | | |
|---|---|---|---|---|
| 2010/0145519 A1* | 6/2010 | Keyl | ............... | B25J 9/1674 |
| | | | | 700/258 |
| 2010/0288067 A1* | 11/2010 | Hofmann | ............... | B25J 9/1674 |
| | | | | 74/490.03 |
| 2011/0273122 A1* | 11/2011 | Murata | ............... | H02P 29/00 |
| | | | | 318/400.22 |
| 2015/0212496 A1* | 7/2015 | Tanabe | ............... | G05B 9/02 |
| | | | | 307/328 |

FOREIGN PATENT DOCUMENTS

| | | |
|---|---|---|
| JP | 2012-150618 A | 8/2012 |
| JP | 2014-087874 A | 5/2014 |

* cited by examiner

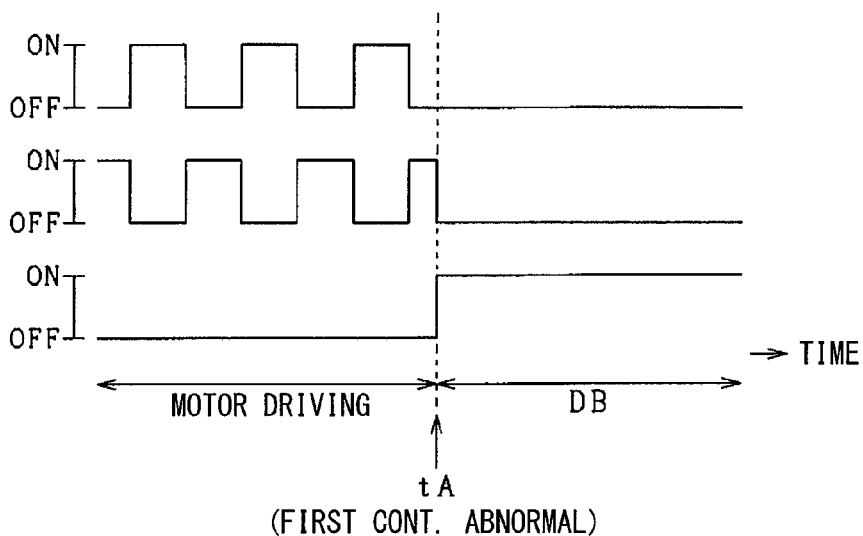
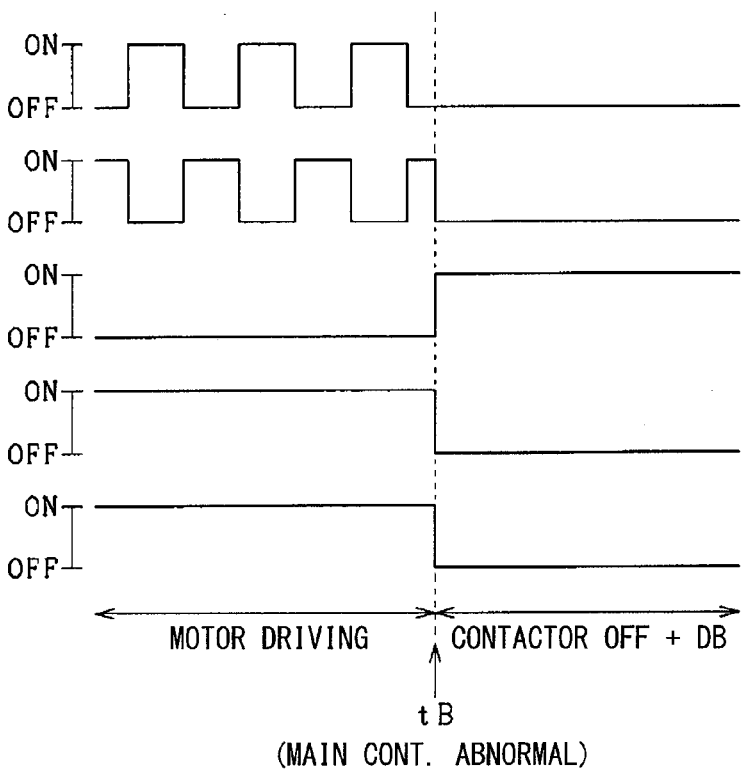

ROBOT SYSTEM

CROSS REFERENCE TO RELATED APPLICATIONS

The present application is based on Japanese Patent Application No. 2015-188078 filed on Sep. 25, 2015, the disclosure of which is incorporated herein by reference.

TECHNICAL FIELD

The present disclosure relates to a robot system.

BACKGROUND

Conventionally, for example, as disclosed in JP 2014-87874 A, a robot system including a three-phase motor and a three-phase inverter is known. In the robot system, the three-phase motor drives each rotation axis of a robot and a three-phase inverter applies an alternating-current (AC) voltage to a stator winding of the motor using an external power source as a power supply source.

Some robot systems include two contactors disposed between an external power source 100 and an inverter 101, as shown in FIG. 9, in order to secure a stop of a robot in case of an occurrence of an abnormality. Specifically, first and second contactors 102a, 102b are disposed between the external power source 100 and a rectifier 103. The rectifier 103 converts an AC voltage output from the external power source 100 into a direct-current (DC) voltage and applies the DC voltage to an inverter 101. The inverter 101 converts the DC voltage into an AC voltage and applies the AC voltage to a motor 104. The first contactor 102a is driven by a first control portion (FIRST CONT.) 105a, and the second contactor 102b is driven by a second control portion (SECOND CONT.) 105b. By the above-described configuration, means for stopping a robot is duplexed, and a stop of the robot in case of an occurrence of an abnormality in the robot system can be secured.

If a configuration in which a contractor is turned off when an abnormality occurs in a robot system is employed, a free run state in which the motor continues rotating by inertia occurs while a power supply from an external power source to a motor is interrupted. In such a case, the robot cannot be stopped quickly at an occurrence of an abnormality in the robot system.

SUMMARY

It is an object of the present disclosure to provide a robot system that can restrict an occurrence of a free run state of a motor while duplexing means for stropping a robot at an occurrence of an abnormality in the robot system.

A robot system according to an aspect of the present disclosure includes a motor, an inverter, a first control portion, and a second control portion. The motor includes stator windings for three phases and drives each rotation axis of a robot. The inverter includes series-connection bodies of a high-side switch and a low-side switch for three phases, and alternately turns on the high-side switch and the low-side switch to apply an alternating current voltage to the corresponding stator winding using an external power source as a power supply source. A connection point of the high-side switch and the low-side switch for each of the phases is connected with the corresponding stator winding. One of the high-side switch and the low-side switch for each of the phases works as a brake switch. The first control portion and the second control portion performs a driving control of the brake switches. Each of the first control portion and the second control portion has a function of monitoring the robot system. Each of the first control portion and the second control portion turns on the brake switches for at least two phases when detecting that an abnormality occurs in the robot system.

In the above-described robot system, the high-side switches or the low-side switches that constitute the three-phase inverter work as brake switches, and each of the first control portion and the second control portion can drive the brake switches. Each of the first control portion and the second control portion has the function of monitoring an abnormality in the robot system.

In the above-described robot system, when at least one of the first control portion and the second control portion detects that an abnormality occurs in the robot system, the control portion that detects the abnormality turns on the brake switches for at least two phases. Accordingly, a close circuit including the stator windings and the brake switches are formed, and a dynamic brake can be applied to the motor to decelerate and stop the motor. Thus, an occurrence of a free run state of the motor when an abnormality occurs in the robot system can be restricted, and the robot can be stopped quickly. Furthermore, because of a configuration in which each of the first control portion and the second control portion turn on the brake switches, means for stopping the robot can be duplexed.

BRIEF DESCRIPTION OF THE DRAWINGS

Additional objects and advantages of the present disclosure will be more readily apparent from the following detailed description when taken together with the accompanying drawings. In the drawings:

FIG. 6A to FIG. 6C are timing diagrams showing a processing of the second control portion when an abnormality occurs in the first control portion;

FIG. 7A to FIG. 7E are timing diagrams showing a processing of the first control portion when an abnormality occurs in the main control portion;

DETAILED DESCRIPTION

Figure 1:
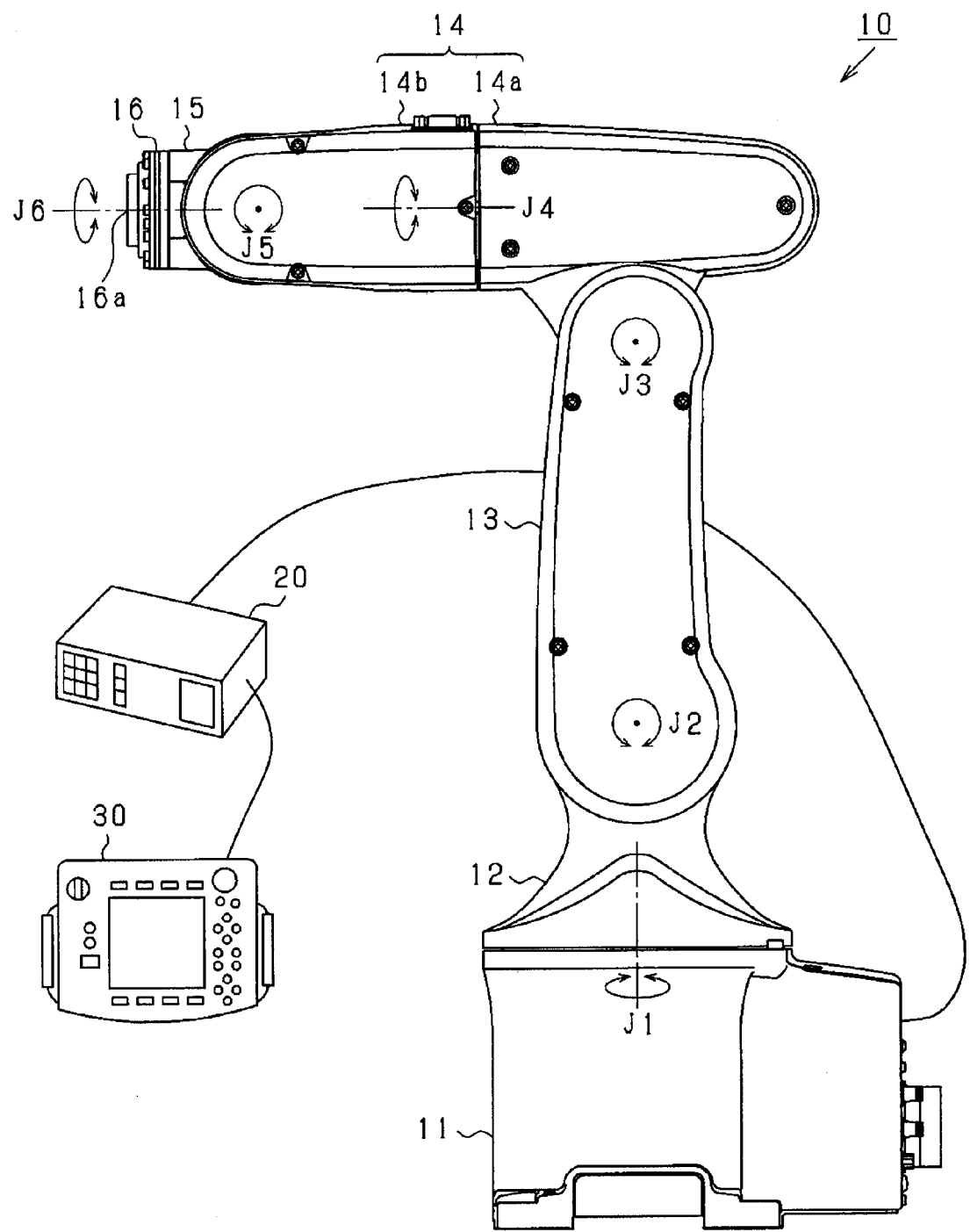
FIG. 1 is a diagram showing a robot system according to a first embodiment.

Before describing embodiments of the present disclosure, various aspects of the present disclosure will be described below.

A robot system according to a first aspect of the present disclosure includes a motor, an inverter, a first control portion, and a second control portion. The motor includes stator windings for three phases and drives each rotation axis of a robot. The inverter includes series-connection bodies of a high-side switch and a low-side switch for three phases, and alternately turns on the high-side switch and the low-side switch to apply an alternating-current voltage to the corresponding stator winding using an external power source as a power supply source. A connection point of the high-side switch and the low-side switch for each of the phases is connected with the corresponding stator winding. One of the high-side switch and the low-side switch for each of the phases works as a brake switch. The first control portion and the second control portion performs a driving control of the brake switches. Each of the first control portion and the second control portion has a function of monitoring the robot system. Each of the first control portion and the second control portion turns on the brake switches for at least two phases when detecting that an abnormality occurs in the robot system.

In the robot system according to the first aspect, the high-side switches or the low-side switches that constitute the three-phase inverter work as brake switches, and each of the first control portion and the second control portion can drive the brake switches. Each of the first control portion and the second control portion has the function of monitoring an abnormality in the robot system.

In the robot system according to the first aspect, when at least one of the first control portion and the second control portion detects that an abnormality occurs in the robot system, the control portion that detects the abnormality turns on the brake switches for at least two phases. Accordingly, a close circuit including the stator windings and the brake switches are formed, and a dynamic brake can be applied to the motor to decelerate and stop the motor. Thus, an occurrence of a free run state of the motor when an abnormality occurs in the robot system can be restricted, and the robot can be stopped quickly. Furthermore, because of a configuration in which each of the first control portion and the second control portion turn on the brake switches, means for stopping the robot can be duplexed.

A robot system according to a second aspect of the present disclosure further includes an interrupting switch electrically connecting the external power source and the inverter when turned on and electrically disconnecting the external power source and the inverter when turned off. One of the first control portion and the second control portion works as a sub control portion, and the sub control portion turns off the interrupting switch when detecting that an abnormality occurs in the robot system.

In the robot system according to the second aspect, the sub control portion, which is at least one of the first control portion and the second control portion, drives the interrupting switch. When the sub control portion detects that an abnormality occurs in the robot system, the sub control portion turns on the brake switches and turns off the interrupting switch. Thus, the dynamic brake can be applied to the motor in a state where the power supply from the external power source to the inverter is interrupted. Accordingly, a time from when the interrupting switch is turned off to when a rotation of the motor (driving of the robot) is stopped can be reduced.

In a robot system according to a third aspect of the present disclosure, each of the first control portion and the second control portion has a function of monitoring an abnormality in each other. The first control portion turns on the brake switches for at least two phases when detecting that an abnormality occurs in the second control portion. The second control portion turns on the brake switches for at least two phases when detecting that an abnormality occurs in the first control portion.

In the robot system according to the third aspect, even when an abnormality occurs in the first control portion and the second control portion, the dynamic brake can be applied to the motor and the motor can be decelerated and stopped.

In a robot system according to a fourth aspect of the present disclosure, one of the first control portion and the second control portion works as a sub control portion that outputs a sub driving signal for driving the brake switches. The robot system further includes an interrupting switch, a main control portion, a main driving portion, and a sub driving portion. The interrupting switch electrically connects the external power source and the inverter when turned on and electrically disconnects the external power source and the inverter when turned off. The main control portion outputs a main driving signal for driving each of the high-side switch and the low-side switch to apply the alternating-current voltage from the inverter to the motor. The main driving portion is configured to be operatable when receiving a power supply from a driving power source and alternately turns on the high-side switch and the low-side switch based on the main driving signal output from the main control portion. The sub driving portion drives the brake switches based on the sub driving signal output from the sub control portion. The sub control portion has a function of monitoring an abnormality in the main control portion. When the sub control portion detects that an abnormality occurs in the main control portion, the sub control portion outputs an on-driving signal of the brake switches as the sub driving signal to the sub driving portion so as to turn on the brake switches for at least two phases, and interrupts the power supply from the driving power source to the main driving portion.

In the robot system according to the fourth aspect, when the main driving signal from the main control portion is input to the main driving portion, the high-side switch and the low-side switch are alternately turned on. Accordingly, the alternating-current voltage is applied to the motor and the motor is driven. When an abnormality occurs in the main control portion, due to a malfunction of the main control portion, the high-side switch and the low-side switch for the same phase may be turned on in a state where the interrupting switch is on. In such a case, there is a risk that a short-circuit current flows to the high-side switch and the low-side switch and reliabilities of the switches is reduced.

Thus, in the robot system according to the fourth aspect, at least one of the first control portion and the second control portion works as the sub control portion, and the sub driving portion that drives the brake switches based on the sub driving signal output from the sub control portion is provided in addition to the main driving portion. The sub control portion has the function of monitoring an abnormality in the main control portion. When the sub control portion detects that an abnormality occurs in the main control portion, the sub control portion outputs the on-driving signal of the brake switches as the sub driving signal to the sub driving portion. Accordingly, the brake switches for at least two phases are turned off, and the dynamic brake is applied.

In addition, when the sub control portion detects that an abnormality occurs in the main control portion, the sub control portion interrupts the power supply from the driving power source to the main driving portion. Accordingly, the operation of the main driving portion can be stopped. Thus, in a state where the abnormality occurs in the main control portion, a flow of a short-circuit current to the high-side switch and the low-side switch due to a malfunction of the main control portion can be restricted.

A robot system according to a fifth aspect of the present disclosure further includes a power switch and a power storage element. The power switch is disposed on a power supply path electrically connecting the driving power source and the main driving portion. The power storage element is electrically connected with the power supply path between the power switch and the main driving portion, and is capable of storing a power supplied from the driving power source via the power switch. The sub control portion interrupts the power supply from the driving power source to the main driving portion by turning off the power switch. The sub control portion includes a detecting portion that detects a driving state of the power switch, and diagnoses an abnormality in the power switch based on a detection result of the detecting portion when the power switch is turned on and off during a driving of the motor.

In the robot system according to the fifth aspect, when the sub control portion detects that an abnormality occurs in the main control portion, the sub control portion turns off the power switch to interrupt the power supply from the driving power source to the main driving portion. If an abnormality occurs in the power switch, when an abnormality occurs in the main control portion, there is a risk that the power supply from the driving power source to the main control portion cannot be interrupted.

Thus, in the robot system according to the fifth aspect, the sub control portion includes the detecting portion that detects the driving state of the power switch. The sub control portion diagnoses an abnormality in the power switch based on the detection result of the detecting portion when the power switch is turned on and off.

Furthermore, the robot system according to the fifth aspect includes the power storage element electrically connected with the power supply path between the power switch and the main driving portion, and being capable of storing the power supplied from the driving power source via the power switch. Thus, even when the power switch is turned off because of the diagnosis and the driving power source and the main driving portion is temporarily disconnected, the power source of the main driving portion can be secured by the power storage element. Accordingly, the on-off driving of the power switch for diagnosing the power switch can be performed during the driving of the motor. Thus, an opportunity of the diagnosis of the power switch can be increased.

A robot system according to a sixth aspect of the present disclosure further includes a resistor and a power resistor. The resistor has a first end electrically connected to the power supply path between a connection point of the power storage element and the power switch and a second end electrically connected to a ground. The power rectifier is disposed on the power supply path between a connection point of the resistor and the connection point of the power storage element, allows an electric current that flows in a predetermined direction from the driving power source toward the main driving portion, and blocks an electric current that flows in an opposite direction from the predetermined direction. The power storage element is capable of storing a power supplied from the driving power source via the power switch and the power rectifier. The detecting portion detects the driving state of the power switch by detecting a potential of the power supply path between the power switch and the power rectifier.

The robot system according to the sixth aspect includes the resistor having the first end electrically connected to the power supply path between the connection point of the power storage element and the power switch and the second end electrically connected to the ground. Thus, the potential of the power supply path between the power switch and the main driving portion changes in accordance with the on-off state of the power switch. Thus, the detecting portion can detect the driving state of the power switch by detecting the potential of the power supply path between the power switch and the main driving portion.

The power supply path and the ground are connected with the resistor for generating a potential change between the power switch and the main driving portion in accordance with the on-off state of the power switch. However, there is a risk that charges stored in the power storage element flows to the ground via the resistor, and the power stored in the storage element is reduced. In such a case, there is a risk that the power required for driving the main driving portion is insufficient.

Thus, in the robot system according to the sixth aspect, the power rectifier is disposed on the power supply path between the connection point of the resistor and the connection point of the power storage element. The power rectifier allows an electric current that flows in the predetermined direction from the driving power source toward the main driving portion, and blocks the electric current that flows in the opposite direction from the predetermined direction. Accordingly, the charges stored in the power storage element can be restricted from flowing to the ground via the resistor that connects the power supply path and the ground, and a reduction of the power stored in the power storage element can be restricted. Thus, the power source of the main driving portion at the diagnosis of the power switch can be appropriately secured.

In a robot system according to a seventh aspect of the present disclosure, the first control portion outputs a first sub driving signal for driving the brake switches, and the second control portion outputs a second sub driving signal for driving the brake switches. The robot system further includes a first sub driving portion, a second sub driving portion, a first rectifier, and a second rectifier. The first sub driving portion is electrically connected with gates of the brake switches, and drives the brake switches by performing a charging and discharging processing of the gates based on the first sub driving signal output from the first control portion. The second sub driving portion is electrically connected with the gates of the brake switches, and drives the brake switches by performing the charging and discharging processing of the gates based on the second sub driving signal output from the second control portion. The first rectifier is disposed on a path electrically connecting the first sub driving portion and the gates, allows an electric current that flows in a first direction from the first sub driving portion toward the gates, and blocks an electric current that flows in an opposite direction from the first direction. The second rectifier is disposed on a path electrically connecting the second sub driving portion and the gates, allows an electric current that flows in a second direction from the second sub driving portion toward the gates, and blocks an electric current that flows in an opposite direction from the second direction. Each of the first control portion and the second control portion has a function of monitoring an abnormality in each other. When the first control portion detects that an abnormality occurs in the second control portion, the first control portion outputs an on-driving signal of the brake switches as the first sub driving signal to the first sub driving portion. The first sub driving signal performs the charging processing of the gates based on the on-driving signal so as to turn on the brake switches for at least two phases. When the second control portion detects that an abnormality occurs in the first control portion, the second control portion outputs an on-driving signal of the brake switches as the second sub driving signal to the second sub driving portion. The second sub driving signal performs the charging processing of the gates based on the on-driving signal so as to turn on the brake switches for at least two phases.

In the robot system according to the seventh aspect, each of the first control portion and the second control portion has the function of monitoring an abnormality in each other. When the first control portion detects that an abnormality occurs in the second control portion, the first control portion outputs the on-driving signal to the first sub driving portion. Accordingly, the first sub driving portion performs the charging processing of the gates of the brake switches, and the brake switches for at least two phases are turned on. As a result, the dynamic brake is applied.

On the other hand, when the second control portion detects that an abnormality occurs in the first control portion, the second control portion outputs the on-driving signal to the second sub driving portion. Accordingly, the second sub driving portion performs the charging processing of the gates of the brake switches, and the brake switches for at least two phases are turned on. As a result, the dynamic brake is applied.

For example, when the first control portion detects that an abnormality occurs in the second control portion, the first sub driving portion performs the charging processing of the gates of the brake switches. In such a case, due to a malfunction of the second control portion in which the abnormality occurs, there is a risk that the second control portion outputs the off-driving signal to the second sub driving portion, and the second sub driving portion performs the discharging processing of the gates. In such a case, there is a risk that the gate charges of the brake switches are pulled out by the second sub driving portion, and the brake switches cannot be turned on. As a result, there is a risk that the dynamic brake cannot be applied.

Thus, in the robot system according to the seventh aspect, the first rectifier is disposed on the path electrically connecting the first sub driving portion and the gates of the brake switches. The first rectifier allows the electric current that flows in the first direction from the first sub driving portion toward the gates, and blocks the electric current that flows in the opposite direction from the first direction. In addition, the second rectifier is disposed on the path electrically connecting the second sub driving portion and the gates. The second rectifier allows the electric current that flows in the second direction from the second sub driving portion toward the gates, and blocks the electric current that flows in the opposite direction from the second direction.

Thus, for example, in a case where the first control portion applies the dynamic brake, even when the second control portion outputs the off-driving signal to the second sub driving portion due to a malfunction of the second control portion, the second rectifier can restrict the gate charges of the brake switches from being pulled out by the second sub driving portion. Accordingly, the dynamic brake can be applied appropriately.

In a robot system according to an eighth aspect of the present disclosure, the first control portion outputs a first sub driving signal that is one of an on-driving signal at a logic H for instructing turning on of the brake switches and an off-driving signal at a logic L for instructing turning off of the brake switches, and the second control portion outputs a second sub driving signal that is one of an on-driving signal at a logic H for instructing turning on of the brake switches and an off-signal at a logic L for instructing turning off of the brake switches. The robot system further includes a first signal path, a second signal path, a common signal path, a first sub driving portion, a second sub driving portion, a first rectifier, and a second rectifier. The first signal path is electrically connected with the first control portion and transmits the first sub driving signal output from the first control portion. The second signal path is electrically connected with the second control portion and transmits the second sub driving signal output from the second control portion. The common signal path is electrically connected with the first signal path and the second signal path and transmits the first sub driving signal and the second sub driving signal transmitted from the first signal path and the second signal path. The first sub driving portion is electrically connected with gates of the brake switches, and drives the brake switches by performing a charging and discharging processing of the gates based on the on-driving signal or the off-driving signal transmitted via the common signal path. The second sub driving portion is electrically connected with the gates of the brake switches, and drives the brake switches by performing the charging and discharging processing of the gates based on the on-driving signal or the off-driving signal transmitted via the common signal path. The first rectifier is disposed on the first signal path between a connection point of the common signal path and the first control portion, allows an electric current that flows in a first direction from the first control portion toward the common signal path, and blocks an electric current that flows in an opposite direction from the first direction. The second rectifier is disposed on the second signal path between a connection point of the common signal path and the second control portion, allows an electric current that flows in a second direction from the second control portion toward the common signal path, and blocks an electric current that flows in an opposite direction from the second direction. Each of the first control portion and the second control portion has a function of monitoring an abnormality in each other. When the first control portion detects that an abnormality occurs in the second control portion, the first control portion outputs the on-driving signal as the first sub driving signal. The first sub driving signal performs the charging processing of the gates based on the on-driving signal so as to turn on the brake switches for at least two phases. When the second control portion detects that an abnormality occurs in the first control portion, the second control portion outputs the on-driving signal as the second sub driving signal, and the second sub driving signal performs the charging processing of the gates based on the on-driving signal so as to turn on the brake switches for at least two phases.

In the robot system according to the eighth aspect, each of the first control portion and the second control portion has the function of monitoring an abnormality in each other. When the first control portion detects that an abnormality occurs in the second control portion, the first control portion outputs the on-driving signal at the logic H to each of the first sub driving portion and the second sub driving portion via the first signal path and the common signal path. Accordingly, each of the first sub driving portion and the second sub driving portion performs the charging processing of the gates of the brake switches, and the brake switches for at least two phases are turned on. As a result, the dynamic brake is applied.

On the other hand, when the second control portion detects that an abnormality occurs in the first control portion, the second control portion outputs the on-driving signal at the logic H to each of the first sub driving portion and the second sub driving portion via the second signal path and the common signal path. Accordingly, each of the first sub driving portion and the second sub driving portion performs the charging processing of the gates of the brake switches, and the brake switches for at least two phases are turned on. As a result, the dynamic brake is applied.

In this way, by the configuration including the common signal path, both of the first sub driving portion and the second sub driving portion can turn on the brake switches, and the dynamic brake can be applied appropriately.

For example, when the first control portion detects that an abnormality occurs in the second control portion, the first control portion outputs the on-driving signal at the logic H. In such a case, due to a malfunction of the second control portion in which the abnormality occurs, the on-driving signal at the logic H output from the first control portion may be pulled to the second control portion via the first signal path, the common signal path, and the second signal path. In such a case, there is a risk that the on-driving signal is not transmitted to each of the first sub driving portion and the second sub driving portion, and the brake switches cannot be turned on. As a result, there is a risk that the dynamic brake cannot be applied.

Thus, in the robot system according to the eighth aspect, the first rectifier is disposed on the first signal path between the connection point of the common signal path and the first control portion. The first rectifier allows the electric current that flows in the first direction from the first control portion toward the common signal path, and blocks the electric current that flows in the opposite direction from the first direction. In addition, the second rectifier is disposed on the second signal path between the connection point of the common signal path and the second control portion. The second rectifier allows the electric current that flows in the second direction from the second control portion toward the common signal path, and blocks the electric current that flows in the opposite direction from the second direction.

Thus, for example, when the first control portion outputs the on-driving signal at the logic H, the second rectifier can restrict the on-driving signal from being pulled to the second control portion due to a malfunction of the second control portion. Accordingly, the dynamic brake can be applied appropriately.

First Embodiment

The following describes a robot system according to a first embodiment of the present disclosure with reference to the drawings. A robot according to the present embodiment is used, for example, in an assembling system in a machine assembly plant as an industrial robot.

Firstly, an outline of the robot system according to the present embodiment will be described with FIG. 1.

As shown in FIG. 1, a robot 10 constituting the robot system includes a plurality of rotating portions and joints connecting the rotating portions. The robot 10 according to the present embodiment is formed as six-axis vertical multi-joint robot.

The robot 10 includes a fixed portion 11 fixed to, for example, a floor, and a first rotating portion 12 disposed above the fixed portion 11. An arm of the robot 10 includes a lower arm 13, an upper arm 14, a wrist portion 15, and a hand portion 16 in addition to the first rotating portion 12. In both ends of the arm, the first rotating portion 12 corresponds to a root portion opposite from an arm tip portion. The first rotating portion 12 is horizontally rotatable around a first axis line J1 that extends vertically.

The first rotating portion 12 is connected with a lower end portion of the lower arm 13. The lower arm 13 corresponds to a second rotating portion and is rotatable clockwise or counterclockwise around a second axis line J2 that extends horizontally. An upper end portion of the lower arm 13 is connected with the upper arm 14. The upper arm 14 is rotatable clockwise or counterclockwise around a third axis line J3 that extends horizontally. The upper arm 14 is divided into a first upper arm 14a and a second upper arm 14b. The first upper arm 14a is disposed on a base side (on a joint side rotating around the third axis line J3) and corresponds to a third rotating portion. The second upper arm 14b is disposed on a tip side and corresponds to a fourth rotating portion. The second upper arm 14b is rotatable in a torsional direction with respect to the first upper arm 14a around a fourth axis line J4 that extends in a longitudinal direction of the upper arm 14.

At a tip portion of the second upper arm 14b, the wrist portion 15 as a fifth rotating portion is provided. The wrist portion 15 is rotatable with respect to the second upper arm 14b around a fifth axis line J5 that extends horizontally. At a tip portion of the wrist portion 15, the hand portion 16 as a sixth rotating portion to be attached with a work piece or a tool is provided. The hand portion 16 is rotatable in a torsional direction around a sixth axis line J6 as a center line of the hand portion 16. A tool center point (TCP) as a center point 16a of the hand portion 16 is set as a control point.

Figure 2:
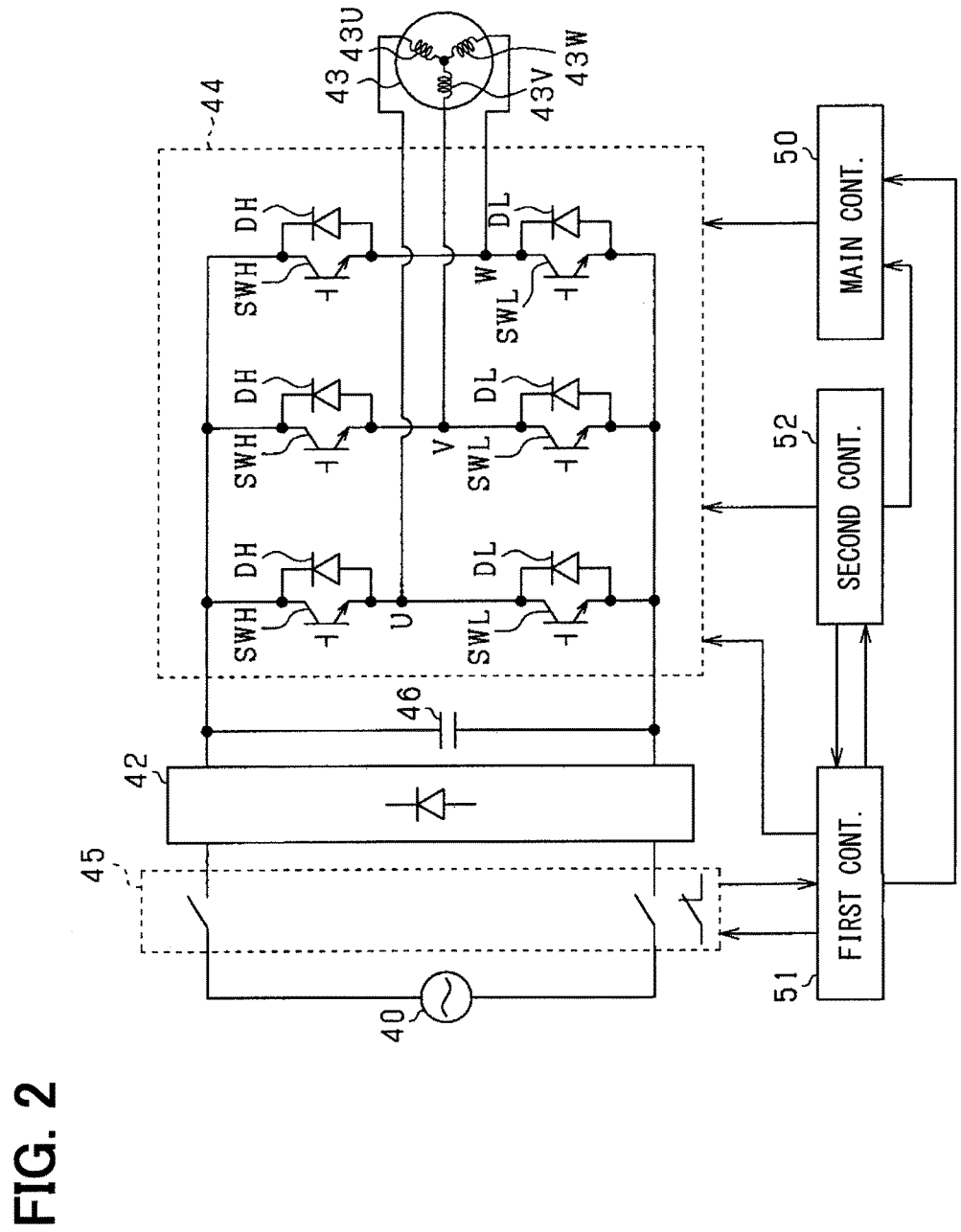
FIG. 2 is a diagram showing an electric configuration of the robot system.

Each of the rotating portions of the robot 10 is driven by a motor 43 provided correspondingly to each of the rotating portions (see FIG. 2). The motor 43 is rotatable in both forward and reverse directions. When the motor 43 is driven, each of the rotating portions is driven with an origin position as a reference.

The robot system further includes a controller 20 that controls the robot 10 and a teaching pendant 30 electrically connected with the controller 20. The teaching pendant 30 includes a microcomputer including a CPU, a ROM, and a RAM, various manual operation keys, and a display. The teaching pendant 30 can communicate with the controller 20. An operator (user) manually operates the teaching pendant 30 to create, correct, and register an operation program of the robot and set various parameters of the robot 10. In a teaching of, for example, correcting the operation program, a teaching point at which the TCP as a control point passes through in an operation is taught. The operator can operate the robot 10 via the controller 20 based on the taught operation program.

Subsequently, an electric configuration of the robot system will be described with reference to FIG. 2.

The controller 20 includes a rectifier 42 and a smoothing capacitor 46. The rectifier 42 converts an AC voltage output from an external power source (commercial power source) to a DC voltage. The smoothing capacitor 46 smoothes the DC voltage output from the rectifier 42. The controller 20 further includes a three-phase inverter 44. The three-phase inverter 44 converts the DC voltage output from the rectifier 42 into an AC voltage and applies the AC voltage to each of stator windings 43U, 43V, 43W of the motor 43. The motor 43 and the inverter 44 are provided individually so as to correspond to each of the rotating portions of the robot 10.

The inverter 44 includes three series-connection bodies of a high-side switch SWH and a low-side switch SWL. A connection point of the high-side switch SWH and the low-side switch SWL for a U-Phase is connected with a first end of a stator winding 43U for the U-phase. A connection point of the high-side switch SWH and the low-side switch SWL for a V-Phase is connected with a first end of a stator winding 43V for the V-phase. A connection point of the high-side switch SWH and the low-side switch SWL for a W-Phase is connected with a first end of a stator winding 43W for the W-phase. Second ends of the stator windings 43U, 43V, 43W are connected with each other at a neutral point. In the present embodiment, a voltage-controlled semiconductor switching element, more specifically, an IGBT is used as each of the switches SWH, SWL. To each of switches SWH, SWL, a free wheel diode DH, DL is connected inversely parallel.

The controller 20 includes a contactor 45 (electromagnetic switch) 45 as an interrupting switch provided on an electrical path that connects the external power source 40 and the smoothing capacitor 46. When the contactor 45 is turned on, the external power source 40 and the rectifier 42 are electrically connected. When the contactor 45 is turned off, the external power source 40 and the rectifier 42 are electrically disconnected. In the present embodiment, the contactor 45 has a back check function to diagnose an abnormality in the contactor 45.

The controller 20 includes a main control portion (MAIN CONT.) 50 that performs a motor control for driving the robot 10. The main control portion 50 is mainly formed from a microprocessor. The main control portion 50 outputs a high-side driving signal SigH and a low-side driving signal SigL as main driving signals for driving the high-side switch SWH and the low-side switch SWL so as to control a control amount (e.g., a rotational speed) of the motor 43 provided correspondingly to each of the rotation axes to a command value. In the present embodiment, each of the driving signals SigH, SigL indicates an on-driving signal by a logic H and indicates an off-driving signal by a logic L.

The controller 20 further includes a first control portion (FIRST CONT.) 51 and a second control portion (SECOND CONT.) 52 which are independent from the main control portion 50. Each of the first control portion 51 and the second control portion 52 has a function of monitoring an abnormality in each other. Each of the first control portion 51 and the second control portion 52 corresponds to a sub control portion that monitors an abnormality in the main control portion 50. The first control portion 51 is mainly formed from a microcomputer and drives the contactor 45. The first control portion 51 grasps presence or absence of an abnormality in the contactor 45 by the back check function of the contactor 45.

The second control portion 52 is provided with the first control portion 51 in the robot system so as to duplex a configuration for stopping the robot 10 in case of an occurrence of an abnormality in the first control portion 51 or the second control portion 52. A configuration for securing a stop of the robot 10 will be described with reference to FIG. 3 to FIG. 5.

Figure 3:
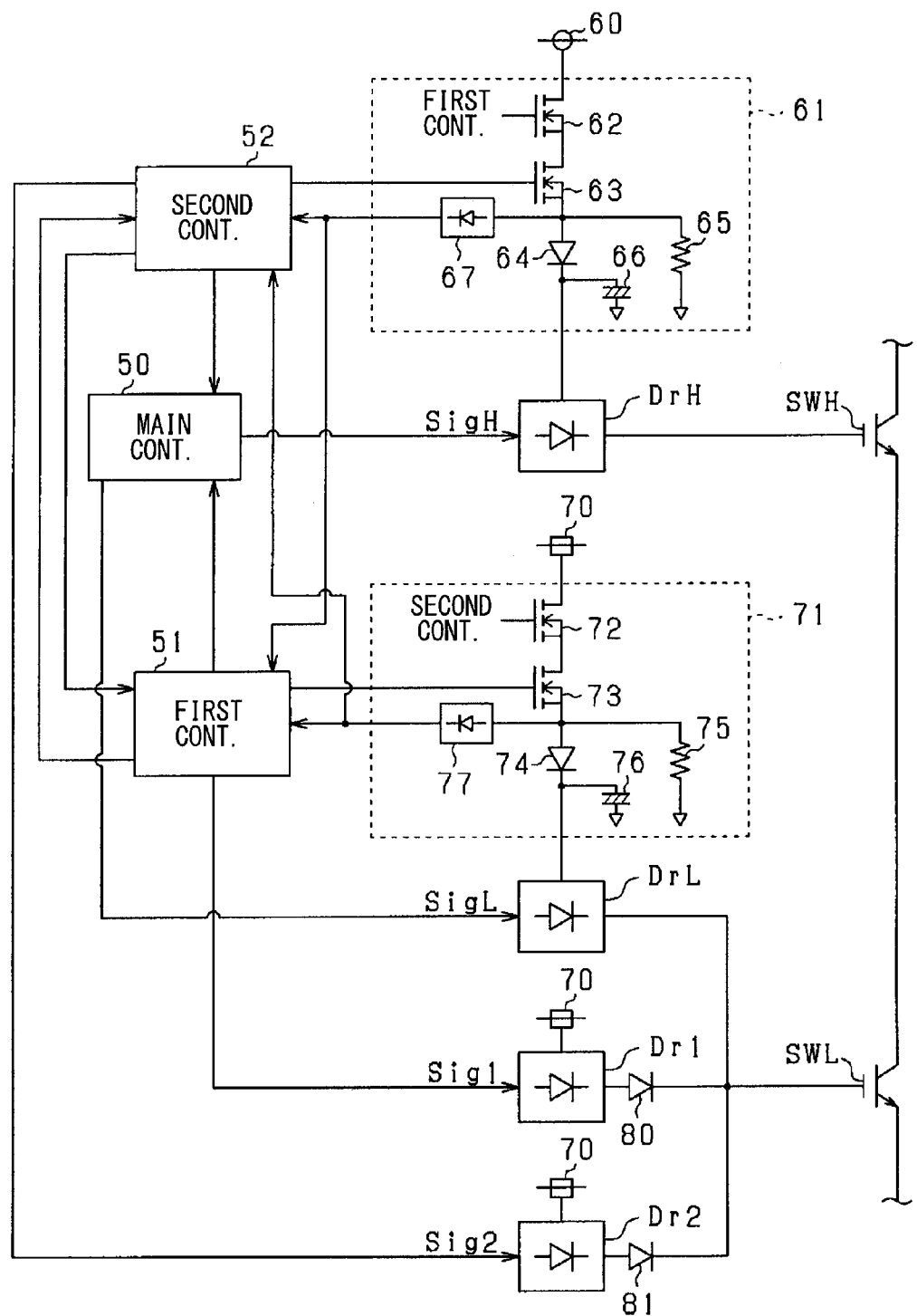
FIG. 3 is a diagram showing a circuit related to driving of a high-side switch and a low-side switch.

In FIG. 3, the configuration for securing the stop of the robot 10 is shown. In the present embodiment, in the configuration shown in FIG. 3, a configuration other than the main control portion 50, the first control portion 51, and the second control portion 52 is individually provided for each of the three phases.

A gate of the high-side switch SWH is connected with a high-side driver DrH as a main driving portion. The high-side driver DrH is operatable using a high-side driving power source 60 as a power supply source. When the high-side driver DrH receives the on-driving signal as the high-side driving signal SigH from the main control portion 50, the high-side driver DrH performs a charging processing of the gate of the high-side switch SWH to turn on the high-side switch SWH. On the other hand, when the high-side driver DrH receives the off-driving signal as the high-side driving signal SigH from the main control portion 50, the high-side driver DrH performs a discharging processing of the gate to turn off the high-side switch SWH.

A gate of the low-side switch SWL is connected with a low-side driver DrL as a main driving portion. The low-side driver DrL is operatable using a low-side driving power source 70 as a power supply source. When the low-side driver DrL receives the on-driving signal as the low-side driving signal SigL from the main control portion 50, the low-side driver DrL performs a charging processing of the gate of the low-side switch SWL to turn on the low-side switch SWL. On the other hand, when the low-side driver DrL receives the off-driving signal as the low-side driving signal SigL from the main control portion 50, the low-side driver DrL performs a discharging processing of the gate to turn off the low-side switch SWL.

The high-side driver DrH is supplied with a power from the high-side driving power source 60 via the high-side power circuit 61. The high-side power circuit 61 includes a series-connection body of a first power switch 62 and a second power switch 63 on a high-side power supply path that connects the high-side driving power source 60 and the high-side driver DrH. In the present embodiment, a semiconductor switch (specifically, an N-channel MOSFET) is used as each of the power switches 62, 63. The high-side driving power source 60 is connected with a drain of the first power switch 62, and a source of the first power switch 62 is connected with a drain of the second power switch 63. The second power switch 63 is turned on and off by the second control portion 52, and the first power switch 62 is turned on and off by the first control portion 51.

A source of the second power switch 63 is connected with an anode of a high-side diode 64 as a power rectifier. A cathode of the high-side diode 64 is connected with the high-side driver DrH.

A connection point of the second power switch 63 and the high-side diode 64 is connected with an emitter (ground) of the high-side switch SWH via a high-side resistor 65. The high-side resistor 65 is provided for changing a potential at the connection point of the second power switch 63 and the high-side diode 64 (hereafter, referred to as a "high-side diagnosis potential") based on on-off states of the first power switch 62 and the second power switch 63. An anode of the high-side diode 64 is connected with the emitter of the high-side switch SWH via a high-side capacitor 66 as a power storage element.

The high-side capacitor 66 works as a power source of the high-side driver DrH when one of the first power switch 62 and the second power switch 63 is temporarily turned off. The high-side diode 64 is provided for restricting a situation that charges stored in the high-side capacitor 66 flow to the emitter via the high-side resistor and the power stored in the high-side capacitor 66 reduces.

The connection point of the second power switch 63 and the high-side diode 64 is further connected with the second control portion 52 via a high-side buffer circuit 67. The second control portion 52 diagnoses presence or absence of an abnormality in the second power switch 63 based on the high-side diagnosis potential input via the high-side buffer circuit 67. Specifically, the second control portion 52 determines that an open fault of the second power switch 63 occurs when the high-side diagnosis potential is 0 (ground) despite that the second power switch 63 is instructed to be turned on in a state where the first power switch 62 is instructed to be turned on. On the other hand, the second control portion 52 determines that a close fault of the second power switch 63 occurs when the high-side diagnosis potential is equal to or greater than a first predetermined value (>0) despite that the second power switch 63 is instructed to be turned off in a state where the first power switch 62 is instructed to be turned on. The first predetermined value is set based on a potential difference generated at the high-side resistor 65 by an electric current that flows into the high-side resistor 65 when the first power switch 62 and the second power switch 63 are turned on.

The connection point of the second power switch 63 and the high-side diode 64 is further connected with the first control portion 51 via the high-side buffer circuit 67. The first control portion 51 diagnoses presence or absence of an abnormality in the first power switch 62 based on the high-side diagnosis potential input via the high-side buffer circuit 67. Specifically, the first control portion 51 determines that an open fault of the first power switch 62 occurs when the high-side diagnosis potential is 0 despite that the first power switch 62 is instructed to be turned on in a state where the second power switch 63 is instructed to be turned on. On the other hand, the first control portion 51 determines that a close fault of the first power switch 62 occurs when the high-side diagnosis potential is equal to or greater than the first predetermined value (>0) despite that the first power switch 62 is instructed to be turned off in a state where the second power switch 63 is instructed to be turned on.

The low-side driver DrL is supplied with a power from the low-side driving power source 70 via a low-side power circuit 71. The low-side power circuit 71 includes a third power switch 72, a fourth power switch 73, a low-side diode 74, a low-side resistor 75, a low-side capacitor 76, and a low-side buffer circuit 77 in a manner similar to the high-side power circuit 61. The third power switch 72 is turned on and off by the second control portion 52, and the fourth power switch 73 is turned on and off by the first control portion 51. An end of the low-side resistor 75 and an end of the low-side capacitor 76 are connected with an emitter (ground) of the low-side switch SWL.

The connection point of the fourth power switch 73 and the low-side diode 74 is connected with the first control portion 51 via the low-side buffer circuit 77. A potential at the connection point of the fourth power switch 73 and the low-side diode 74 is referred to as a low-side diagnosis potential. The first control portion 51 diagnoses presence or absence of an abnormality in the fourth power switch 73 based on the low-side diagnosis potential input via the low-side buffer circuit 77. Specifically, the first control portion 51 determines that an open fault of the fourth power switch 73 occurs when the low-side diagnosis potential is 0 despite that the fourth power switch 73 is instructed to be turned on in a state where the third power switch 72 is instructed to be turned on. On the other hand, the first control portion 51 determines that a close fault of the fourth power switch 73 occurs when the low-side diagnosis potential is equal to or greater than a second predetermined value (>0) despite that the fourth power switch 73 is instructed to be turned off in a state where the third power switch 72 is instructed to be turned on. The second predetermined value is set based on a potential difference generated at the low-side resistor 75 by an electric current that flows into the low-side resistor 75 when the third power switch 72 and the fourth power switch 73 are turned on.

The connection point of the fourth power switch 73 and the low-side diode 74 is further connected with the second control portion 52 via the low-side buffer circuit 77. The second control portion 52 diagnoses presence or absence of an abnormality in the third power switch 72 based on the low-side diagnosis potential. Specifically, the second control portion 52 determines that an open fault of the third power switch 72 occurs when the low-side diagnosis potential is 0 despite that the third power switch 72 is instructed to be turned on in a state where the fourth power switch 73 is instructed to be turned on. On the other hand, the second control portion 52 determines that a close fault of the third power switch 72 occurs when the low-side diagnosis potential is equal to or greater than the second predetermined value despite that the third power switch 72 is instructed to be turned off in a state where the fourth power switch 73 is instructed to be turned on. The above-described diagnosis processing by the first control portion 51 and the second control portion 52 may be performed at each predetermined period.

In the present embodiment, the low-side switch SWL can be driven by a first sub driver Dr1 and a second sub driver Dr2 as sub driving portions. Specifically, the gate of the low-side switch is connected with a cathode side of a first diode 80 as a first rectifier, and an anode side of the first diode 80 is connected with the first sub driver Dr1. The first sub driver Dr1 is operatable using the low-side driving power source 70 as a power supply source. When the first sub driver Dr1 receives an on-driving signal at the logic H as a first sub driving signal Sig1 from the first control portion 51, the first sub driver Dr1 performs a charging processing of the gate of the low-side switch SWL to turn on the low-side switch SWL. On the other hand, when the first sub driver Dr1 receives an off-driving signal at the logic L as the first sub driving signal Sig1 from the first control portion 51, the first sub driver Dr1 performs a discharging processing of the gate of the low-side switch SWL to turn off the low-side switch SWL.

The gate of the low-side switch SWL is connected with a cathode side of a second diode 81 as a second rectifier, and an anode side of the second diode 81 is connected with the second sub driver Dr2. The second sub driver Dr2 is operatable using the low-side driving power source 70 as a power supply source. When the second sub driver Dr2 receives an on-driving signal at the logic H as a second sub driving signal Sig2 from the second control portion 52, the second sub driver Dr2 performs the charging processing of the gate to turn on the low-side switch SWL. On the other hand, when the second sub driver Dr2 receives an off-driving signal as the second sub driving signal Sig2 from the second control portion 52, the second sub driver Dr2 performs a discharging processing of the gate to turn off the low-side switch SWL.

Figure 4:
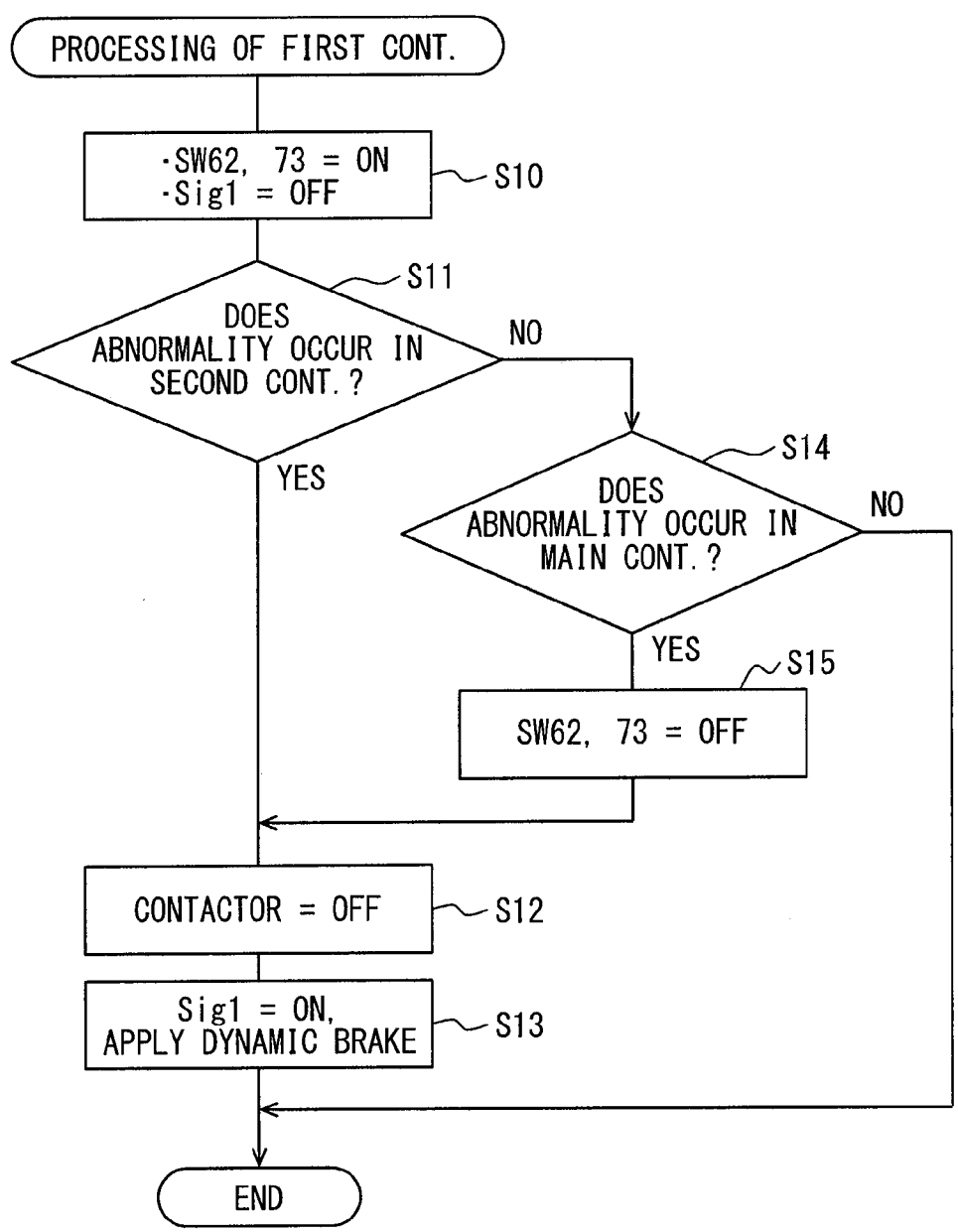
FIG. 4 is a flowchart showing a processing performed by a first control portion.

Next, a processing performed by the first control portion 51 will be described with reference to FIG. 4. The processing is repeatedly performed by the first control portion 51 at a predetermined period.

Firstly, at S10, the first control portion 51 maintains the first power switch 62 and the fourth power switch 73 to be on, and maintains the first sub driving signal Sig1 to be the off-driving signal.

At S11, the first control portion 51 determines whether an abnormality occurs in the second control portion 52 using the monitoring function. If the first control portion 51 determines that an abnormality occurs at S11, the processing proceeds to S12, and the first control portion 51 turns off the contactor 45. Accordingly, the power supply from the external power source 40 to the inverter 44 is interrupted, and the robot 10 is stopped.

At S13, the first control portion 51 sets the first sub driving signal Sig1 to be the on-driving signal to turn on all the low-side switches SWL for three phases that form the inverter 44. Accordingly, a closed circuit including the stator windings 43U, 43V, 43W and the low-side switches SWL is formed, and an electric current that flows due to induction voltages of the stator windings 43U, 43V, 43W is converted into heat in the closed circuit. As a result, a dynamic brake is applied to the robot 10.

On the other hand, when the first control portion 51 determines that an abnormality does not occur in the second control portion 52 at S11, the processing proceeds to S14, and the first control portion 51 determines whether an abnormality occurs in the main control portion 50. When the first control portion 51 determines that an abnormality occurs in the main control portion 50 at S14, the processing proceeds to S15, and the first control portion 51 turns off the first power switch 62 and the fourth power switch 73. Accordingly, the power supply from the high-side driving power source 60 to the high-side driver DrH and the power supply from the low-side driving power source 70 to the low-side driver DrL are interrupted.

The processing at S15 is performed for restricting a reduction of a reliability of the inverter 44. If an abnormality occurs in the main control portion 50, the high-side switch SWL and the low-side switch SWL of the U-phase may be turned on in a state where the contactor 45 is on due to a malfunction of the main control portion 50. In such a case, there is a risk that a short-circuit current flows to the high-side switch SWL and the low-side switch SWL, and eventually, the reliability of the inverter is reduced. Thus, when the first control portion 51 determines that an abnormality occurs in the main control portion 50, the power supply to the high-side driver DrH and the low-side driver DrL is interrupted to stop the operations of the high-side driver DrH and the low-side driver DrL. After the processing at S15 ends, the processing proceeds to S12.

Also when the first control portion 51 diagnoses that an abnormality occurs in one of the first power switch 62 and the fourth power switch 73 in the diagnosis processing, the first control portion 51 may perform the processing at S12 and S13.

Figure 5:
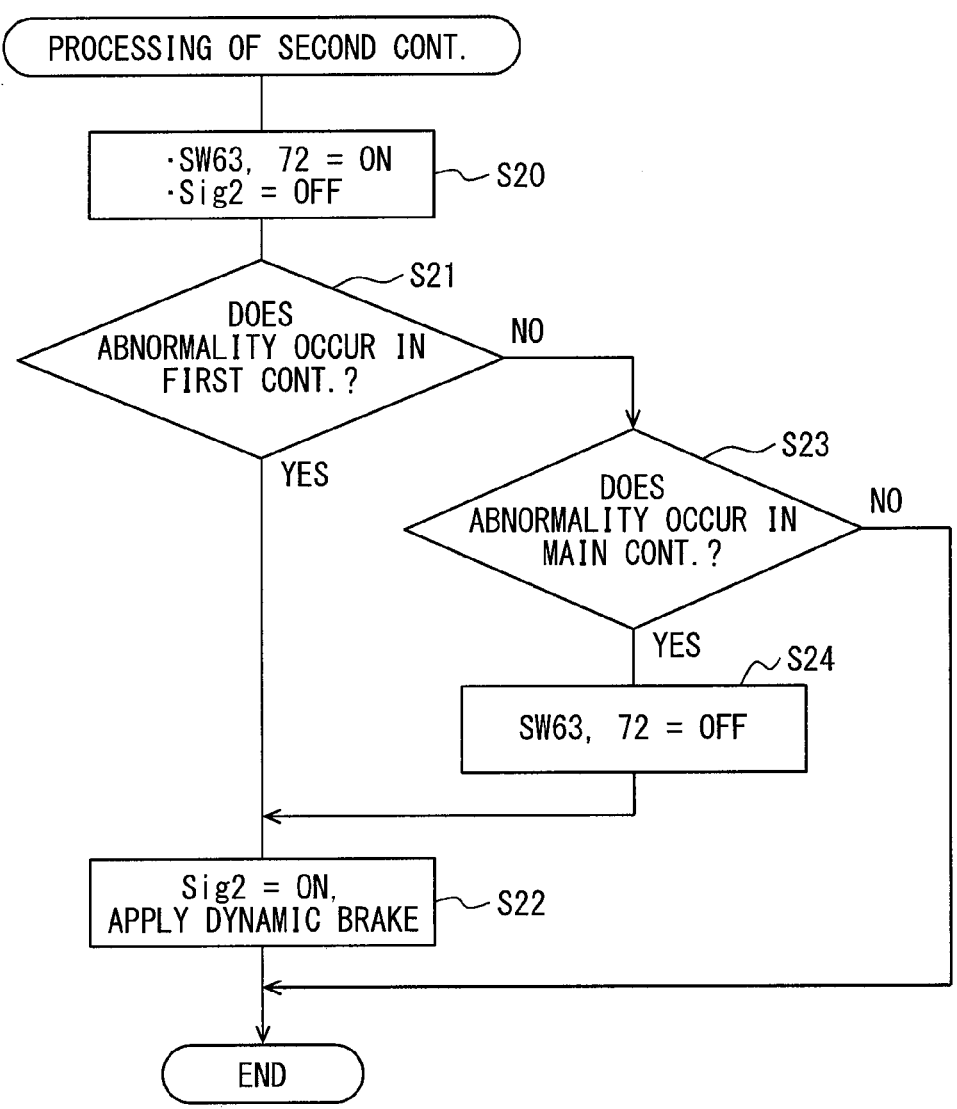
FIG. 5 is a flowchart showing a processing performed by a second control portion.

Next, a processing performed by the second control portion 52 will be described with reference to FIG. 5. The processing is repeatedly performed by the second control portion 52 at a predetermined period.

Firstly, at S20, the second control portion 52 maintains the second power switch 63 and the third power switch 72 to be on, and maintains the second sub driving signal Sig2 to be the off-driving signal.

At S21, the second control portion 52 determines whether an abnormality occurs in the first control portion 51 using the monitoring function. In the present embodiment, the second control portion 52 determines that an abnormality occurs in the first control portion 51 even when the first control portion 51 determines that an abnormality occurs in the contactor 45.

When the second control portion 52 determines that an abnormality occurs at S21, the processing proceeds to S22. At S22, the second control portion 52 sets the second sub driving signal Sig2 to be the on-driving signal to turn on all the low-side switches SWL for three phases that form the inverter 44. Accordingly, the dynamic brake is applied to the robot 10.

On the other hand, when the second control portion 52 determines that an abnormality does not occur in the first control portion 51, the processing proceeds to S23, and the second control portion 52 determines whether an abnormality occurs in the main control portion 50. When the second control portion 52 determines that an abnormality occurs in the main control portion 50 at S23, the processing proceeds to S24, and the second control portion 52 turns off the second power switch 63 and the third power switch 72. Accordingly, the power supply from the high-side driving power source 60 to the high-side driver DrH and the power supply from the low-side driving power source 70 to the low-side driver DrL are interrupted. The processing at S24 is provided for the same object as the processing at S15. After the processing at S24 ends, the processing proceeds to S22.

Also when the second control portion 52 diagnoses that an abnormality occurs in one of the second power switch 63 and the third power switch 72 in the diagnosis processing, the second control portion 52 may perform the processing at S22.

Next, a processing performed by the second control portion 52 when an abnormality occurs in the first control portion 51 will be described with reference to FIG. 6A to FIG. 6C. FIG. 6A and FIG. 6B respectively show transition of the high-side driving signal SigH and the low-side driving signal SigL output from the main control portion 50, and FIG. 6C show transition of the second sub driving signal Sig2 output from the second control portion 52. In FIG. 6A and FIG. 6B, illustration of dead time is omitted.

In an example shown in FIG. 6A to FIG. 6C, in a state where the high-side driving signal SigH and the low-side driving signal SigL are alternately set to be the on-driving signal, at time tA, the second control portion 52 determines that an abnormality occurs in the first control portion 51. Thus, the second sub driving signal Sig2 output from the second control portion 52 is transitioned to the on-driving signal, and the low-side switches SWL for three phases are turned on as braking switches. As a result, the dynamic brake is applied to the robot 10, and the robot 10 is stopped.

Next, a processing performed by the first control portion 51 when an abnormality occurs in the main control portion 50 will be described with reference to FIG. 7A to FIG. 7E. FIG. 7A and FIG. 7B correspond to FIG. 6A and FIG. 6B, and FIG. 7C shows transition of the first sub driving signal Sig1 output from the first control portion 51. FIG. 7D shows transition of a driving state of the contactor 45, and FIG. 7E shows transition of driving states of the first power switch 62 and the fourth power switch 73.

In an example shown in FIG. 7A to FIG. 7E, in a state where the high-side driving signal SigH and the low-side driving signal SigL are alternately set to be the on-driving signal, at time tB, the first control portion 51 determines that an abnormality occurs in the main control portion 50. Thus, after the contactor 45 is turned off by the first control portion 51, the first sub driving signal Sig1 output from the first control portion 51 is transitioned to the on-driving signal. As a result, the dynamic brake is applied to the robot 10 in a state where the power supply from the external power source 40 to the inverter 44 is interrupted. In addition, the first power switch 62 and the fourth power switch 73 are turned off. As a result, the power supply to the high-side driver DrH and the low-side driver DrL is interrupted.

The present embodiment has following advantages.

Figure 9:
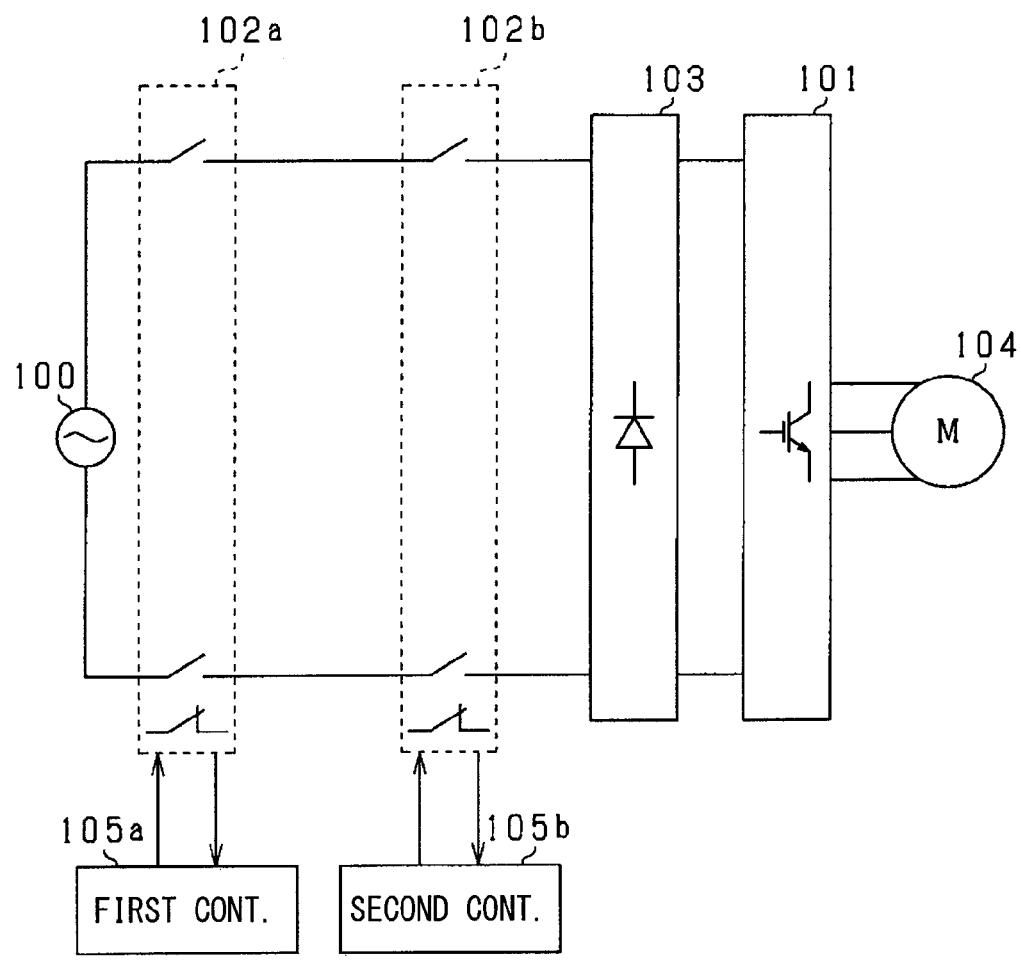
FIG. 9 is a diagram showing an electric configuration of a robot system according to a related art.

When the first control portion 51 determines that an abnormality occurs in the second control portion 52, the first control portion 51 turns on the low-side switches SWL for three phases. In contrast, when the second control portion 52 determines that an abnormality occurs in the first control portion 51, the second control portion 52 turns on the low-side switches SWL for three phases. Thus, even when an abnormality occurs in one of the first control portion 51 and the second control portion 52, the dynamic brake can be applied to the motor 43. Thus, an occurrence of the free run state of the motor 43 can be restricted, and the robot 10 can be stopped quickly. Furthermore, because of the configuration in which each of the first control portion 51 and the second control portion 52 turns on the low-side switches SWL for three phases, means for stopping the robot 10 can be duplexed without proving two contactors between the external power source and the inverter as shown in FIG. 9.

A closing circuit for the dynamic brake is formed from the components of the inverter 44 and the motor 43, such as the low-side switches SWL and the stator windings 43U, 43V, 43W. Thus, the number of components for the dynamic brake in the components of the robot system can be reduced.

When the first control portion 51 determines that an abnormality occurs in the second control portion 52, the first control portion 51 turns on the low-side switches SWL for three phases after turning off the contactor 45. Thus, the dynamic brake can be applied to the motor 43 in a state where the power supply to the external power source 40 to the inverter 44 is interrupted. Accordingly, an occurrence of the free run state of the motor 43 can be restricted after interrupting the power supply to the inverter 44, and a time from when the contactor 45 is turned off till when the rotational speed of the motor 43 becomes 0 (the arm of the robot 10 is stopped) can be reduced.

The first sub driver Dr1 and the second sub driver Dr2 driven by the first control portion 51 and the second control portion 52 are provided in the robot system in addition to the high-side driver DrH and the low-side driver DrL. When at least one of the first control portion 51 and the second control portion 52 determines that an abnormality occurs in the main control portion 50, the dynamic brake is applied, and the power supply from the high-side driving power source 60 and the low-side driving power source 70 to the high-side driver DrH and the low-side driver DrL is interrupted. Accordingly, the operation of the high-side driver DrH and the low-side driver DrL can be stopped, and a short-circuit current that flows to the high-side switches SWH and the low-side switches SWL due to a malfunction of the main control portion 50 can be restricted.

On the high power supply path connecting the high-side driving power source 60 and the high-side driver DrH, the high-side capacitor 66 is connected between the high-side diode 64 and the high-side driver DrH. Thus, even when one of the first power switch 62 and the second power switch 63 is temporarily turned off due to the diagnosis of one of the first power switch 62 and the second power switch 63, the power source of the high-side driver DrH can be secured by the high-side capacitor 66. Accordingly, the on-off driving of the first power switch 62 and the second power switch 63 for diagnosing an abnormality in the first power switch 62 and the second power switch 63 can be performed during driving of the motor 43. Thus, an opportunity of diagnosing the first power switch 62 and the second power switch 63 can be increased. Similarly in the low side, because of the low-side capacitor 76, an opportunity of diagnosing the third power switch 72 and the fourth power switch 73 can be increased.

The first diode 80 is disposed on a path electrically connecting the first sub driver Dr1 and the gate of the low-side switch SWL. In addition, the second diode 81 is disposed on a path electrically connecting the second sub driver Dr2 and the gate of the low-side switch SWL. Thus, for example, when an abnormality occurs in the second control portion 52, and the first control portion 51 instructs to apply the dynamic brake, the second diode 81 can restrict pulling out of gate charges from the second sub driver Dr2 due to a malfunction of the second control portion 52. Accordingly, the dynamic brake can be applied appropriately.

Second Embodiment

Figure 8:
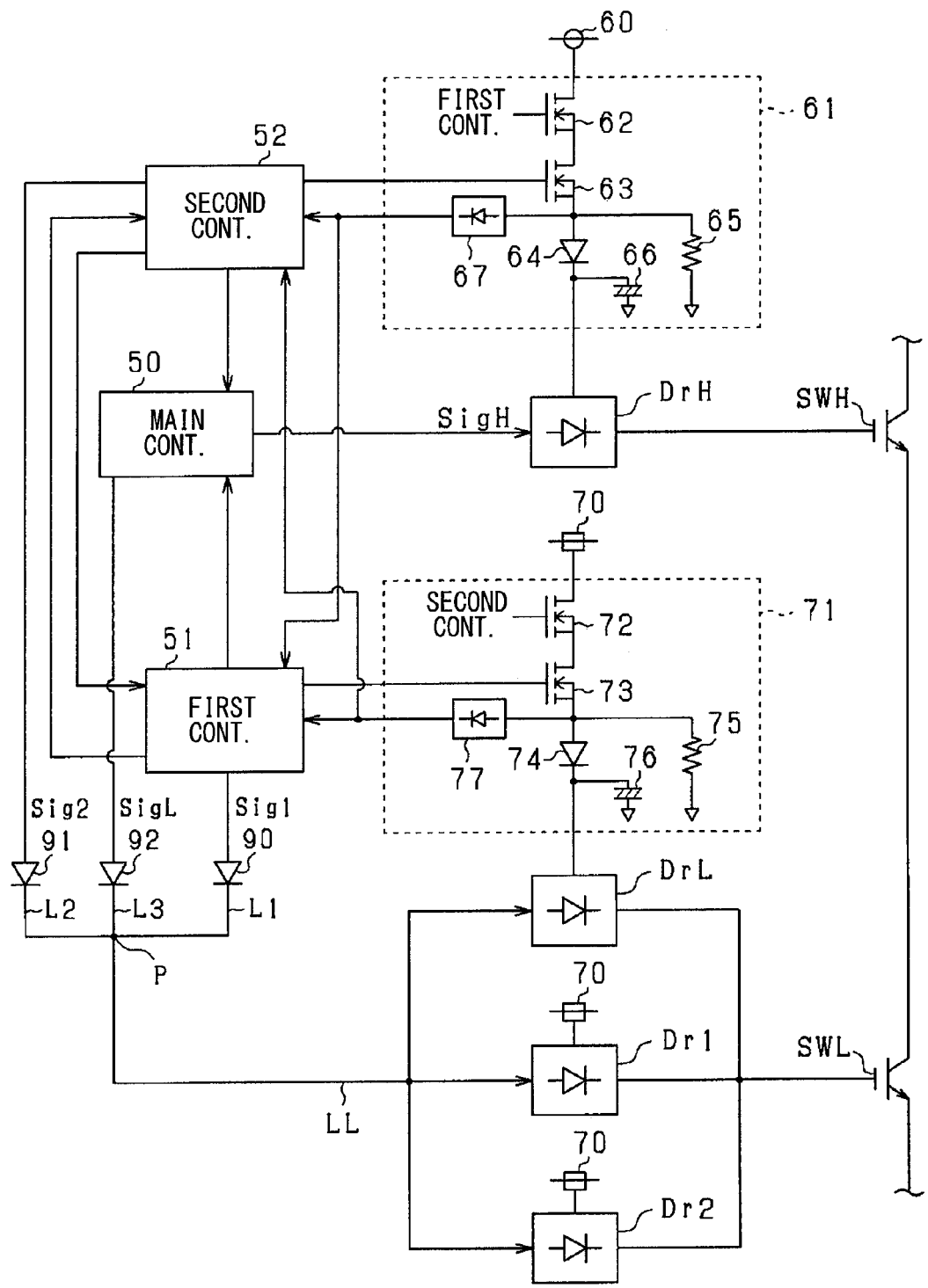
FIG. 8 is a diagram showing a circuit related to driving of a high-side switch and a low-side switch according to a second embodiment.

A second embodiment of the present disclosure will be described with a focus on differences from the first embodiment. In the present embodiment, a first sub diode 90, a second sub diode 91, and a third sub diode 92 are provided instead of the first diode 80 and the second diode 81. In FIG. 8, components same as the components shown in FIG. 3 are denoted by the same reference signs.

The first control portion 51 is connected with a first signal path L1 that transmits the first sub driving signal Sig1 output from the first control portion 51. The second control portion 52 is connected with a second signal path L2 that transmits the second sub driving signal Sig2 output from the second control portion 52. The main control portion 50 is connected with a third signal path L3 that transmits the low-side driving signal SigL output from the main control portion 50.

A junction P of the first signal path L1, the second signal path L2, and the third signal path L3 is connected with a common signal path LL that transmits the driving signals Sig1, Sig2, SigL transmitted from the signal paths L1, L2, L3. The common signal path LL is connected with the low-side driver DrL, the first sub driver Dr1, and the second sub driver Dr2.

The first sub diode 90 is disposed on the first signal path L1 between the junction P and the first control portion 51. An anode of the first sub diode 90 is connected to the first control portion 51, and a cathode of the first sub diode 90 is connected to the junction P.

The second sub diode 91 is disposed on the second signal path L2 between the junction P and the second control portion 52. An anode of the second sub diode 91 is connected to the second control portion 52, and a cathode of the second sub diode 91 is connected to the junction P.

The third sub diode 92 is disposed on the third signal path L3 between the junction P and the main control portion 50. An anode of the third sub diode 92 is connected to the main control portion 50, and a cathode of the third sub diode 92 is connected to the junction P.

The first to third sub diodes 90-92 are provided for appropriately applying the dynamic brake even when an abnormality occurs in one of the main control portion 50, the first control portion 51, and the second control portion 52. Namely, for example, when the first control portion 51 detects that an abnormality occurs in the main control portion 50, the first control portion 51 outputs the on-driving signal at the logic H. In such a case, the on-driving signal at the logic H output from the first control portion may be pulled to the main control portion 50 via the first signal path L1, the common signal path LL, and the third signal path L3 due to a malfunction of the main control portion 50 in which the abnormality occurs. In such a case, there is a risk that the on-driving signal is not transmitted to any one of the low-side driver DrL, the first sub driver Dr1, and the second sub driver Dr2, and the low-side switch SWL cannot be turned on. As a result, there is a risk that the dynamic brake cannot be applied.

Thus, in the present embodiment, the first to third sub diodes 90-92 are provided. Thus, for example, when the first control portion 51 outputs the on-driving signal at the logic H, the third sub diode 92 can restrict the on-driving signal from being pulled to the main control portion 50 due to a malfunction of the main control portion 50. Accordingly, the dynamic brake can be applied appropriately.

Other Embodiments

The above-described embodiments can be modified as follows.

In each of the above-described embodiments, the dynamic brake can be applied by turning on the low-side switches SWL for two phases.

In each of the above-described embodiments, the dynamic brake can be applied by turning on the high-side switches SWH for two phases instead of the low-side switches SWL.

In each of the above-described embodiments, one of the first control portion 51 and the second control portion 52 may have a function of monitoring an abnormality in the main control portion 50.

In each of the above-described embodiments, the second control portion 52 may have a function of turning off the contactor 45 when the second control portion 52 detects an abnormality in the first control portion 51.

In each of the above-described embodiments, at least one of the first control portion 51 and the second control portion 52 may have a function of monitoring an abnormality in the robot system including the inverter 44 and the motor 43 in addition to the control portion. In such a case, when the control portion having the function of monitoring an abnormality detects an abnormality in the robot system, the dynamic brake is applied.

In each of the above-described embodiments, when the first control portion 51 detects an abnormality in the second control portion 52, the first control portion 51 does not have to turn off the contactor 45. Also in such a case, when all the low-side switches SWL for three phases are turned on and the dynamic brake is applied, an electric current does not flow from the rectifier 42 to the inverter 44 because all the high-side switches SWH are turned off. Thus, the motor 43 can be decelerated and stopped.

In FIG. 3 in the first embodiment, on a path electrically connecting the low-side driver DrL and the gate of the low-side switch SWL, a diode may be provided in such a manner that an anode is connected to the low-side driver DrL and a cathode is connected to the gate. In such a case, in order to turn off the low-side switch SWL based on the off-driving signal of the low-side driving signal SigL, the gate and the emitter of the low-side switch SWL may be connected by a resistor.

In the first embodiment, the first diode 80 and the second diode 81 are not necessary.

In the second embodiment, the junction P of the signal paths L1, L2, L3 and the sub diodes 90-92 are disposed outside each of the drivers DrL, Dr1, Dr2. However, the sub diodes 90-92 may be disposed in each of the drivers DrL, Dr1, Dr2.

In the second embodiment, the third signal path L3 may be connected only with the low-side driver DrL without being connected to the junction P.

Methods of detecting the driving states of the power switches 62, 63, 72, 73 are not limited to the above-described examples. For example, the driving state of the second power switch 63 may be detected based on a voltage between the drain and the source of the second power switch 63.

The motor is not limited to a synchronous machine and may be an induction machine.

The robot is not limited to the vertical multi-joint type and may be a horizontal multi-joint type.

What is claimed is:

1. A robot system comprising:
a motor including stator windings for three phases and driving each rotation axis of a robot;
an inverter including series-connection bodies of a high-side switch and a low-side switch for the three phases, and alternately turning on the high-side switch and the low-side switch to apply an alternating-current voltage to the corresponding stator winding using an external power source as a power supply source, a connection point of the high-side switch and the low-side switch for each of the phases being connected with the corresponding stator winding, one of the high-side switch and the low-side switch for each of the phases working as a brake switch; and
a first control portion and a second control portion performing a driving control of the brake switches, each of the first control portion and the second control portion having a function of monitoring the robot system, and each of the first control portion and the second control portion turning on the brake switches for at least two phases when detecting that an abnormality occurs in the robot system, wherein
each of the first control portion and the second control portion has a function of monitoring an abnormality in each other,
the first control portion turns on the brake switches for at least two phases when detecting that an abnormality occurs in the second control portion, and
the second control portion turns on the brake switches for at least two phases when detecting that an abnormality occurs in the first control portion.

2. The robot system according to claim 1, further comprising
an interrupting switch electrically connecting the external power source and the inverter when turned on and electrically disconnecting the external power source and the inverter when turned off, wherein
one of the first control portion and the second control portion works as a sub control portion, and the sub control portion turns off the interrupting switch when detecting that an abnormality occurs in the robot system.

3. The robot system according to claim 1, wherein
one of the first control portion and the second control portion works as a sub control portion that outputs a sub driving signal for driving the brake switches, the robot system further comprising:
an interrupting switch electrically connecting the external power source and the inverter when turned on and electrically disconnecting the external power source and the inverter when turned off;
a main control portion outputting a main driving signal for driving each of the high-side switch and the low-side switch to apply the alternating-current voltage from the inverter to the motor;
a main driving portion configured to be operatable when receiving a power supply from a driving power source and alternately turning on the high-side switch and the low-side switch based on the main driving signal output from the main control portion; and
a sub driving portion driving the brake switches based on the sub driving signal output from the sub control portion, wherein
the sub control portion has a function of monitoring an abnormality in the main control portion, and when the sub control portion detects that an abnormality occurs in the main control portion, the sub control portion outputs an on-driving signal of the brake switches as the sub driving signal to the sub driving portion so as to turn on the brake switches for at least two phases, and interrupts the power supply from the driving power source to the main driving portion.

4. The robot system according to claim 3, further comprising:
a power switch disposed on a power supply path electrically connecting the driving power source and the main driving portion; and
a power storage element electrically connected with the power supply path between the power switch and the main driving portion, and being capable of storing a power supplied from the driving power source via the power switch, wherein
the sub control portion interrupts the power supply from the driving power source to the main driving portion by turning off the power switch, and
the sub control portion includes a detecting portion that detects a driving state of the power switch, and diagnoses an abnormality in the power switch based on a detection result of the detecting portion when the power switch is turned on and off during a driving of the motor.

5. The robot system according to claim 4, further comprising:
a resistor having a first end electrically connected to the power supply path between a connection point of the power storage element and the power switch and a second end electrically connected to a ground; and
a power rectifier disposed on the power supply path between a connection point of the resistor and the connection point of the power storage element, allowing an electric current that flows in a predetermined direction from the driving power source toward the main driving portion, and blocking an electric current that flows in an opposite direction from the predetermined direction, wherein
the power storage element is capable of storing a power supplied from the driving power source via the power switch and the power rectifier, and
the detecting portion detects the driving state of the power switch by detecting a potential of the power supply path between the power switch and the power rectifier.

6. The robot system according to claim 1, wherein
the first control portion outputs a first sub driving signal for driving the brake switches, and
the second control portion outputs a second sub driving signal for driving the brake switches, the robot system further comprising:
a first sub driving portion electrically connected with gates of the brake switches, and driving the brake switches by performing a charging and discharging processing of the gates based on the first sub driving signal output from the first control portion;
a second sub driving portion electrically connected with the gates of the brake switches, and driving the brake switches by performing the charging and discharging processing of the gates based on the second sub driving signal output from the second control portion;
a first rectifier disposed on a path electrically connecting the first sub driving portion and the gates, allowing an electric current that flows in a first direction from the first sub driving portion toward the gates, and blocking an electric current that flows in an opposite direction from the first direction; and
a second rectifier disposed on a path electrically connecting the second sub driving portion and the gates, allowing an electric current that flows in a second direction from the second sub driving portion toward the gates, blocking an electric current that flows in an opposite direction of the second direction, wherein
when the first control portion detects that an abnormality occurs in the second control portion, the first control portion outputs an on-driving signal of the brake switches as the first sub driving signal to the first sub driving portion,
the first sub driving signal performs the charging processing of the gates based on the on-driving signal so as to turn on the brake switches for at least two phases,
when the second control portion detects that an abnormality occurs in the first control portion, the second control portion outputs an on-driving signal of the brake switches as the second sub driving signal to the second sub driving portion, and
the second sub driving signal performs the charging processing of the gates based on the on-driving signal so as to turn on the brake switches for at least two phases.

7. The robot system according to claim 1, wherein
the first control portion outputs a first sub driving signal that is one of an on-driving signal at a logic H for instructing turning on of the brake switches and an off-driving signal at a logic L for instructing turning off of the brake switches, and
the second control portion outputs a second sub driving signal that is one of an on-driving signal at a logic H for instructing turning on of the brake switches and an off-driving signal at a logic L for instructing turning off of the brake switches, the robot system further comprising:
a first signal path electrically connected with the first control portion and transmitting the first sub driving signal output from the first control portion;
a second signal path electrically connected with the second control portion and transmitting the second sub driving signal output from the second control portion;
a common signal path electrically connected with the first signal path and the second signal path and transmitting the first sub driving signal and the second sub driving signal transmitted from the first signal path and the second signal path;
a first sub driving portion electrically connected with gates of the brake switches, and driving the brake switches by performing a charging and discharging processing of the gates based on the on-driving signal or the off-driving signal transmitted via the common signal path;
a second sub driving portion electrically connected with the gates of the brake switches, and driving the brake switches by performing the charging and discharging processing of the gates based on the on-driving signal or the off-driving signal transmitted via the common signal path;
a first rectifier disposed on the first signal path between a connection point of the common signal path and the first control portion, allowing an electric current that flows in a first direction from the first control portion toward the common signal path, and blocking an electric current that flows in an opposite direction from the first direction; and a second rectifier disposed on the second signal path between a connection point of the common signal path and the second control portion, allowing an electric current that flows in a second direction from the second control portion toward the common signal path, and blocking an electric current that flows in an opposite direction from the second direction, wherein when the first control portion detects that an abnormality occurs in the second control portion, the first control portion outputs the on-driving signal as the first sub driving signal, the first sub driving signal performs the charging processing of the gates based on the on-driving signal so as to turn on the brake switches for at least two phases, when the second control portion detects that an abnormality occurs in the first control portion, the second control portion outputs the on-driving signal as the second sub driving signal, and the second sub driving signal performs the charging processing of the gates based on the on-driving signal so as to turn on the brake switches for at least two phases.

* * * * *